United States Patent
Jo (10) Patent No.: US 9,626,761 B2
(45) Date of Patent: Apr. 18, 2017

(54) SAMPLING METHOD AND IMAGE PROCESSING APPARATUS OF CS-RANSAC FOR ESTIMATING HOMOGRAPHY

(71) Applicant: INHA-Industry Partnership Institute, Incheon (KR)

(72) Inventor: Geun Sik Jo, Incheon (KR)

(73) Assignee: INHA INDUSTRY PARTNERSHIP INSTITUTE, Icheon (KR)

( * ) Notice: Subject to any disclaimer, the term of this patent is extended or adjusted under 35 U.S.C. 154(b) by 18 days.

(21) Appl. No.: 14/680,969

(22) Filed: Apr. 7, 2015

(65) Prior Publication Data
US 2016/0189359 A1    Jun. 30, 2016

(30) Foreign Application Priority Data
Dec. 31, 2014 (KR) .......................... 10-2014-0195389

(51) Int. Cl.
*G06K 9/46* (2006.01)
*G06T 7/00* (2017.01)
*G06K 9/62* (2006.01)

(52) U.S. Cl.
CPC ............ *G06T 7/004* (2013.01); *G06K 9/4604* (2013.01); *G06K 9/6202* (2013.01); *G06T 2207/10004* (2013.01)

(58) Field of Classification Search
CPC .... G06K 9/6202; G06K 9/4604; G06T 7/004; G06T 2207/10004
USPC .......................................... 382/173, 201, 228
See application file for complete search history.

(56) References Cited

U.S. PATENT DOCUMENTS

| | | | | |
|---|---|---|---|---|
| 9,189,966 B2 * | 11/2015 | Li | ............................ | G09B 7/02 |
| 2011/0206296 A1 * | 8/2011 | Sakaguchi | ............ | G06T 3/4053 |
| | | | | 382/299 |
| 2014/0044348 A1 * | 2/2014 | Chen | .................. | G06K 9/00221 |
| | | | | 382/159 |
| 2016/0142644 A1 * | 5/2016 | Lin | ........................ | H04N 5/265 |
| | | | | 348/143 |

OTHER PUBLICATIONS

Dubrofsky "Homography Estimation", The University of British Columbia, pp. 1-28, 2009.*
Thomas, et al. ((Fast Robust Perspective Transform Estimation for Automatic Registration in Disaster Response Applications), IEEE, pp. 2190-2193, 2012.*

* cited by examiner

*Primary Examiner* — Daniel Mariam
(74) *Attorney, Agent, or Firm* — Madeline F. Schiesser; Keohane & D'Alessandro PLLC (57) ABSTRACT

Disclosed is a sampling method for estimating a homography matrix. This sampling method, for estimating a homography matrix that represents conversion correlations between pluralities of images by means of Constraint Satisfaction-Random Sample Consensus (CS-RANSAC), includes the steps of: sampling to divide an input image into a form of grids (N by N), select features, which are used for calculating a homography matrix, from features, which are abstracted from the input image, by means of a random sampling, and inspect whether the features selected by the random sampling satisfy predefined constraints; and executing model estimation to calculate the homography matrix from the features only if the selected features satisfy the constraints.

17 Claims, 10 Drawing Sheets

Reference image    Camera image

Reference image    Camera image

| Group | Definition | Image | Feature |
|---|---|---|---|
| G1 | Few features distributed over the whole image |  |  |
| G2 | Many features distributed over the whole image |  |  |
| G3 | Many features distributed over the center of the image |  |  |
| G4 | Few features distributed over a specific area of the image |  |  |
| G5 | Many features distributed over a specific area of the image |  |  |

| Class | Optimal grid size | Characteristics (in average) | |
|---|---|---|---|
| G1 | 17 x 17 | Processing time<br>symmetric transfer error<br>inlier rate | : 84.94 ms<br>: 54.39 pixels<br>: 48.06% |
| G2 | 23 x 23 | Processing time<br>symmetric transfer error<br>inlier rate | : 125.87 ms<br>: 18.82 pixels<br>: 61.65 % |
| G3 | 24 x 24 | Processing time<br>symmetric transfer error<br>inlier rate | : 67.67 ms<br>: 29.39 pixels<br>: 66.88% |
| G4 | 27 x 27 | Processing time<br>symmetric transfer error<br>inlier rate | : 18.93 ms<br>: 39.78 pixels<br>: 75.34 % |
| G5 | 21 x 21 | Processing time<br>symmetric transfer error<br>inlier rate | : 25.33 ms<br>: 13.24 pixels<br>: 79.17% |

Fig. 9

(a) Selected Features are formed in linearity (b) Selected features are crowded in a specific area

Fig. 10

SAMPLING METHOD AND IMAGE PROCESSING APPARATUS OF CS-RANSAC FOR ESTIMATING HOMOGRAPHY

BACKGROUND

Embodiments of the inventive concept relate to a sampling method and image processing apparatus of RANSAC and CS-RANSAC algorithms for obtaining plane homography between two images.

In recent years, Augmented Reality (AR) systems are attracted as effective means for visualizing weather information which can be expressed in texts, still images, animations, videos, displays for mobile devices, or 3D objects of cameras. In some applications, AR systems are steadily studied to enable highly complex and microscopic works such as maintenance and repair of aircrafts.

To accurately synthesize virtual objects on camera images in an AR system, it is necessary to precisely estimate poses of the virtual objects. Those virtual object poses may be estimated by calculating homography matrixes between reference images and camera images.

The homography matrix is calculated through a Random Sample Consensus (RANSAC) algorithm and each sample set is selected at random. Hereat, the accuracy of the homography matrix generated by the RANSAC algorithm is considerably dependent on features which are randomly selected.

A general RANSAC algorithm usually operates to select features without regarding positional correlations between the features. During this, sets of the selected features form linearity or placed so closely, finally degrading the accuracy of the homography matrix.

Figure 1:
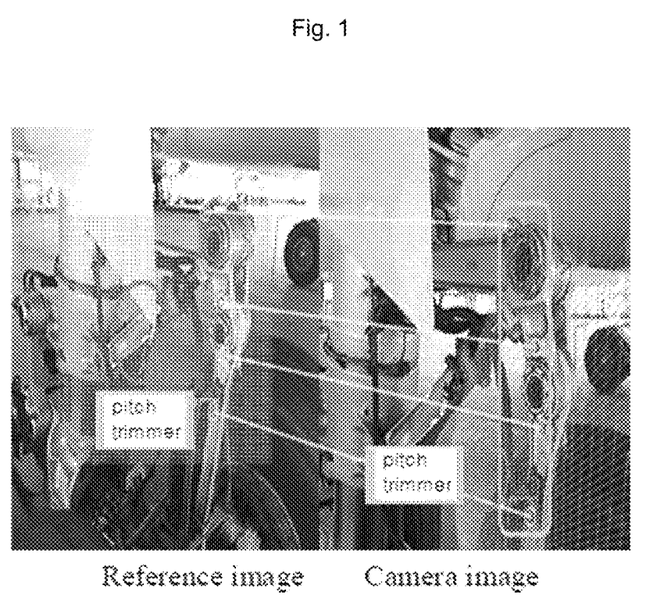
FIG. 1 shows pixels mapped with features which form linearity.
Figure 2:
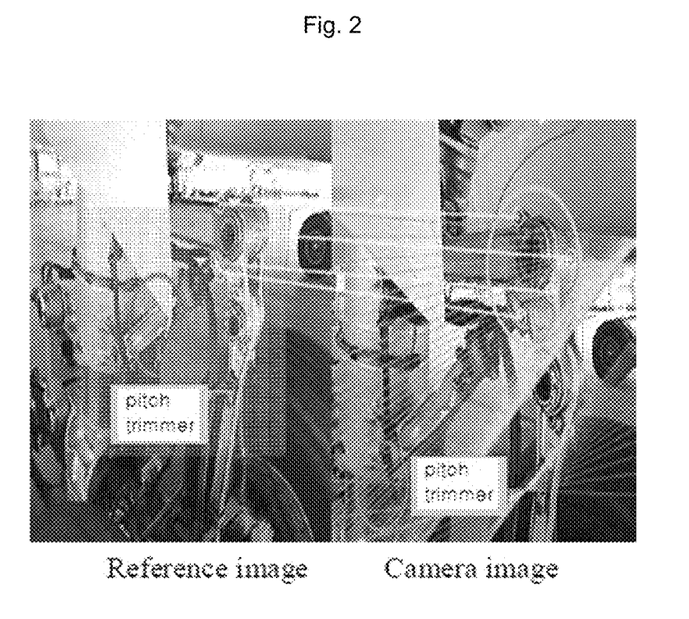
FIG. 2 shows pixels mapped with features which are placed within a distance.

FIGS. 1 and 2 illustrate pixels where reference images are mapped with camera images.

Referring to FIG. 1, pixels included in the reference images of the left are mapped to camera images of the right. This pixel mapping is carried out by means of a homography matrix which is calculated from selected four pairs of features. In FIG. 1, the feature pairs are indicated by yellow circles. As shown in FIG. 1, if the selected features form linearity, the features just can accurately estimate poses of objects which are placed in a selected specific area (e.g. the area in the yellow rectangular box of FIG. 1), but inaccurate in estimating poses of objects placed in other areas (e.g. a pitch trimmer indicated by the orange circuit). As shown in FIG. 2, even if selected features are placed in a distance, it is difficult to accurately estimate poses of objects as like the case of linearity. In other words, the accuracy of the homography matrix is degraded to be worse.

A general RANSAC algorithm is formed of hypothesis and estimation steps. In the hypothesis step, features are selected at random. In the estimation step, the consistency between two features (e.g. the number of inliers) is inspected. Those two steps are repeated until a process of finding better features for representing datasets becomes failed. As such, to raise the accuracy of homography matrix, there are proposed an LO-RS algorithm, a T-RS algorithm, an MF-RS algorithm, and so on.

However, since homography matrixes calculated by the LO-RS algorithm, the T-RS algorithm, and the MF-RS algorithm also include insignificant samples (features laid on linearity or crowded in a specific area), it is difficult to accurately estimate poses of objects throughout the whole area of image. That is, the accuracy of homography matrix is still standing in a low level.

Therefore, when estimating a plane homography matrix between two images in an AR system requiring a powerful chase function, there is a need of technology for accurately estimating the homography matrix to the whole area not to a specific area.

SUMMARY

One aspect of embodiments of the inventive concept is therefore directed to highly accurate homography estimation, without abstracting an insignificant sample (features laid on linearity or crowded in a specific area) while sampling an RANSAC algorithm, in estimating a homography by means of the RANSAC algorithm.

Another aspect of embodiments of the inventive concept is directed to reducing the whole number of iterations of an RANSAC algorithm by estimating a superior homography in one sampling operation.

Still another aspect of embodiments of the inventive concept are directed to efficiently processing an RANSAC algorithm by estimating a homography matrix from dynamic application with constraints and sizes of grid patterns in correspondence with images.

In an embodiment, a sampling method, for estimating a homography matrix that represents conversion correlations between pluralities of images by means of Constraint Satisfaction-Random Sample Consensus (CS-RANSAC), may include the steps of: sampling to divide an input image into a form of grids (N by N), select features, which are used for calculating a homography matrix, from features, which are abstracted from the input image, by means of a random sampling, and inspect whether the features selected by the random sampling satisfy predefined constraints; and executing model estimation to calculate the homography matrix from the features only if the selected features satisfy the constraints.

The sampling step may be configured to dynamically apply grid sizes in accordance with a distribution pattern of the features abstracted from the input image.

The sampling step, as the features selected through the random sampling disagree with the constraints, may be configured to reapply the random sampling to the features abstracted from the input image, and reselect features for calculating the homography matrix.

The sampling step, as the features selected through the random sampling disagree with the constraints, may be configured to reselect features, which are used for calculating the homography matrix, from features, which are abstracted from the input image, with reference to similarity of the abstracted features.

The sampling step, as the features selected through the random sampling disagree with the constraints, may be configured to reselect features, which are used for calculating the homography matrix, with reference to the predetermined number of iteration times and the maximum number of sampling times.

The sampling step may be configured to dispersedly classify features, which are distributed over the whole area of the input image, and select the features, which are used for calculating the homography matrix, by applying Constraint Satisfaction Problems (CSP).

The CSP may be configured to include variables that represent the features, domains that represent positional correlations of the features, and the constraints.

A size of a grid area, in which the features are dispersedly classified, may be dynamically determined by a distribution pattern of the features abstracted from the input image.

The sampling step may be configured to execute a predisposing process that divides the input image of the plural images into pluralities of grid areas, and classifies the features, which are abstracted from the input image, into the grid areas.

The sampling step may be configured to classify the features, which correspond to each unit grid, with reference to coordinate values of the features.

The sampling step may be configured to apply at least one of linear and distance constraints, the linear constraint being configured to prevent other features from being selected at a position forming linearity with the selected features, and the distance constraint being configured to prevent other features from being selected in a distance from the selected features.

The linear constraint may satisfy all conditions of selecting one feature from one unit grid, selecting one feature from grid areas of the same row, selecting one feature from grid areas of the same column, and selecting one feature from grid areas of the same diagonal.

In another embodiment, a computer readable medium may include instructions to control a computer system to execute a Constraint Satisfaction-Random Sample Consensus (CS-RANSAC) algorithm. The CS-RANSAC algorithm may be a method of a homography matrix that represents conversion correlations between pluralities of images. The instructions may be configured to control the computer system through a method including the steps of: sampling to select features, which are used for calculating a homography matrix, from features, which are abstracted from an input image of the plural images, by means of a random sampling, and inspect whether the features selected by the random sampling satisfy predefined constraints; and executing model estimation to calculate the homography matrix from the features that satisfy the constraints.

The sampling step may be configured to execute a predisposing process that divides the input image of the plural images into pluralities of grid areas, and classifies the features, which are abstracted from the input image, into the grid areas.

In still another embodiment, an image processing apparatus, for estimating a homography matrix that represents conversion correlations between pluralities of images by means of Constraint Satisfaction-Random Sample Consensus (CS-RANSAC), may include: a sampler configured to select features, which are used for calculating a homography matrix, from features, which are abstracted from the input image, by means of a random sampling, and inspect whether the features selected by the random sampling satisfy predefined constraints; and a model estimator configured to calculate the homography matrix from the features that satisfy the constraints.

The sampler may be configured to dynamically apply one of pluralities of predefined grid sizes in accordance with a distribution pattern of the feature abstracted from the input image.

The sampler, as the features selected through the random sampling disagree with the constraints, may be configured to reapply the random sampling to the features abstracted from the input image, and reselect features for calculating the homography matrix.

The sampler, as the features selected through the random sampling disagree with the constraints, may be configured to reselect features, which are used for calculating the homography matrix, from features, which are abstracted from the input image, with reference to similarity of the abstracted features.

The sampler may be configured to execute a predisposing process that divides the input image of the plural images into pluralities of grid areas, and classifies the features, which are abstracted from the input image, into the grid areas.

The sampler may be configured to apply at least one of linear and distance constraints, the linear constraint being configured to prevent other features from being selected at a position forming linearity with the selected features, the distance constraint being configured to prevent other features from being selected in a distance from the selected features.

According to embodiments of the inventive concept, estimating a homography by means of the RANSAC algorithm may be carried out to exclude abstracting an insignificant sample (features laid on linearity or crowded in a specific area) while sampling an RANSAC algorithm, thereby obtaining highly accurate homography estimation.

Additionally, it may be attainable to reduce the whole number of iterations of an RANSAC algorithm by estimating a superior homography in one sampling operation.

Additionally, it may be attainable to efficiently processing an RANSAC algorithm by estimating a homography matrix from dynamic application with constraints and sizes of grid patterns in correspondence with images.

DETAILED DESCRIPTION

Now hereinafter will be described exemplary embodiments of the inventive concept in conjunction with accompanying drawings.

The present embodiments of the inventive concept will be provided to improve the accuracy of an RNASAC algorithm for obtaining a plane homography between two images, which is involved in a sampling method of the RNASAC algorithm capable of abstracting samples to estimate a highly accurate homography, without selecting samples that may estimate an incorrect homography, when abstracting samples for obtaining a homography in a sampling process of an RANSAC algorithm.

Additionally, the present embodiments of the inventive concept will be provided to a correct homography matrix between two images.

Additionally, the present embodiments of the inventive concept will be provided to more accurately estimate a homography matrix, which is especially concerned in a sampling method of estimating a homography matrix by means of a Constraint Satisfaction-Random Sample Consensus (CS-RABSAC) algorithm.

To obtain a homography matrix between two images, a Speeded Up Robust Feature (SURF) descriptor may work to abstract features which can be respectively representative of images. These abstracted features may be compared in similarity by means of Euclidean distance to match the features up with their similars. Then a homography matrix may be obtained from the matched pairs of the features.

During this, at least four pairs of features are needed to obtain a homography matrix, which must be selected from a feature set. However, there would be an error while comparing the similarity among the features, thereby generating mismatched pairs of features. These mismatched pairs of features do not contribute to obtaining an accurate result of a homography matrix.

Therefore, an RANSAC algorithm may be employed to obtain a homography matrix without any mismatched pairs of features (outliers). The RABSAC algorithm is a technique of repetitively estimating mathematical model parameters from a data set, which includes false information, through random sampling. The RANSAC algorithm is applied to evade mismatched distinct pairs in probability from a set of mismatched distinct pairs (a data set including outliers) by way of random sampling, and then obtain a more accurate homography matrix.

In a random sampling under a general RANSAC algorithm, since insignificant values (it is hard to obtain an accurate homography if a homography matrix is calculated from a selected feature pairs) would be selected when selecting the feature pairs for obtaining the homography matrix, there would be degraded efficiency of the RANSAC algorithm and accuracy of homography matrix.

For solving this shortness, the present embodiments of the inventive concept are provided to raise efficiency of the RANSAC algorithm and accuracy of the homography matrix by applying constraints to a sampling process of the RANSAC algorithm.

Problem Definition

Assuming that the total number of features abstracted from an image is m (|X|=m), a process of selecting features for estimating a homography matrix may be involved in a combination by which r-numbered (r≥4) features are selected from different m-numbered features.

Equation 1 is used to calculate the occasional number of combinations and it is assumed that the number of features abstracted from a single image is 100.

$$_mC_r = \frac{m!}{r!(m-r)!} \quad \text{[Equation 1]}$$

To estimate a homography matrix, the occasional number for selecting four features may result in 3,921,225 as given by Equation 2.

$$_{100}C_4 = \frac{100!}{4!(100-4)!} = 3921225 \quad \text{[Equation 2]}$$

As those 3,921,225 combinations of features may include mismatches of feature pairs and it is so inefficient to obtain all of homography matrixes from the features of such combinations, an RABSAC algorithm may be employed herein.

In the RABSAC algorithm, a homography matrix may be calculated by means of features which are randomly selected through a random sampling not by counting all of the occasional number. A process of calculating a homography matrix by means of the RANSAC algorithm will be described later with reference to FIGS. 3 and 4.

Figure 3:
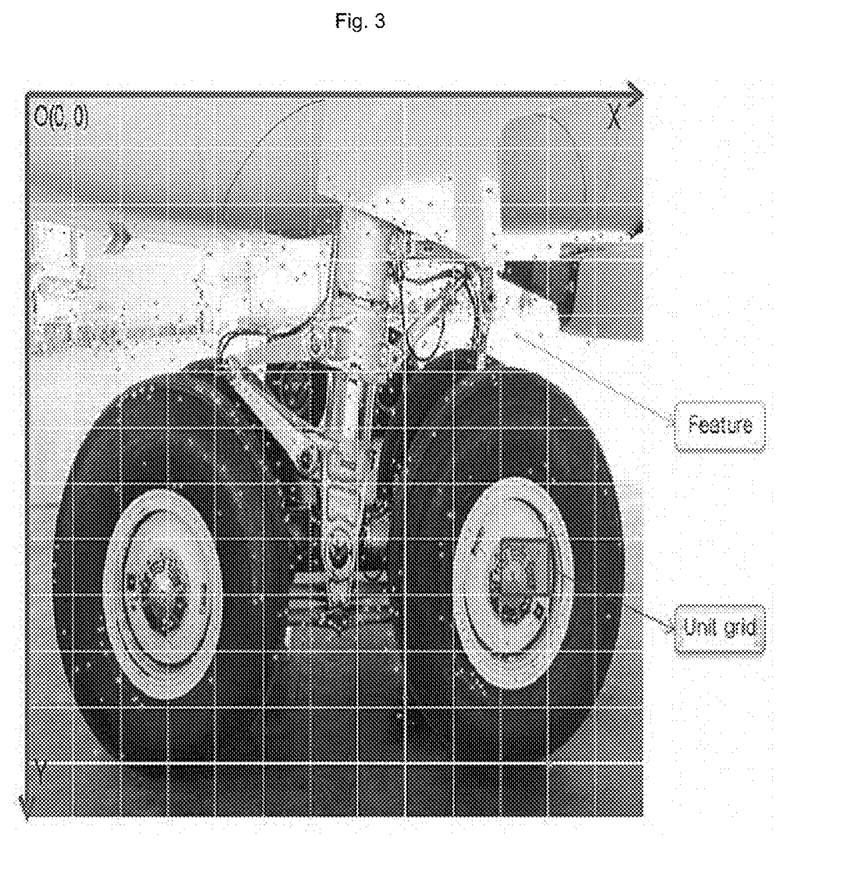
FIG. 3 shows a process of dividing a target image into grid areas for applying CSP to a sampling process of the RANSAC algorithm in an embodiment of the inventive concept.
Figure 4:
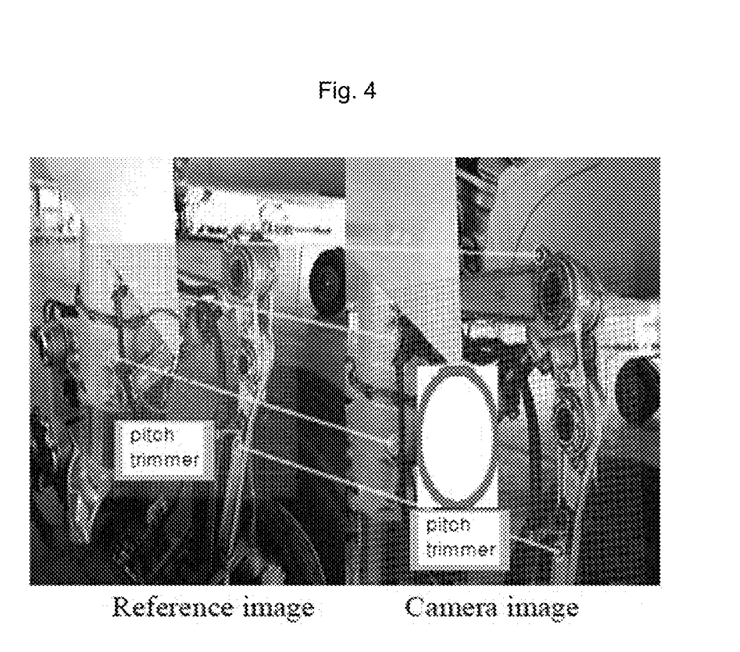
FIG. 4 shows an operation of select features, which are distributed over the whole area of an image, without insignificant samples in an embodiment of the inventive concept.
Figure 5:
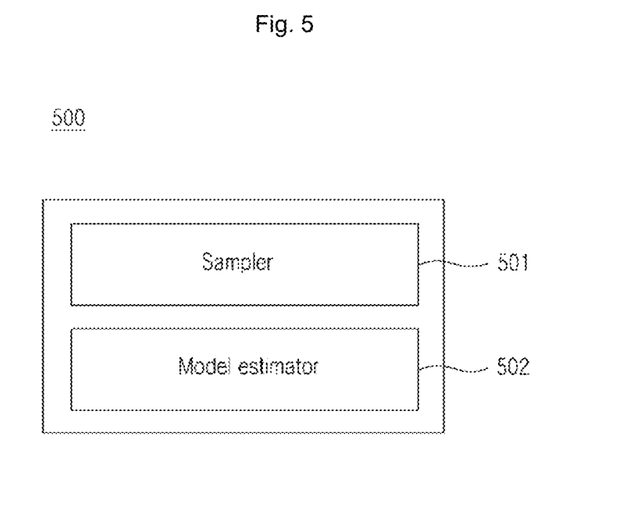
FIG. 5 is a block diagram illustrating an image processing apparatus to estimate a homography matrix in the inventive concept.

FIG. 3 shows a process of dividing a target image into grid areas for applying CSP to a sampling process of the RANSAC algorithm in an embodiment of the inventive concept, FIG. 4 shows an operation of select features, which are distributed over the whole area of an image, without insignificant samples in an embodiment of the inventive concept, and FIG. 5 is a block diagram illustrating an image processing apparatus to estimate a homography matrix in the inventive concept.

The process of dividing a target image into grid areas and the operation of selecting features from the whole image without insignificant samples, in FIGS. 4 and 5, may be performed in the image processing apparatus of FIG. 5. In FIG. 5, the image processing apparatus 500 may include a sampler 501 and an estimator 502. The embodiments of the inventive concept, relevant to improving accuracy of the RANSAC algorithm for obtaining a plane homography between two images, are concerned with a sampling method (CS-RANSAC) under a CSP-based RANSAC algorithm capable of abstracting a highly accurate homography without samples involved in an incorrect homography when abstracting samples to obtain homographies during a sampling process of the RANSAC algorithm.

In the RANSAC algorithm, without considering all of the occasional number, a homography matrix is calculated using features which are randomly selected by means of a random sampling. The process of calculating a homography matrix by the RANSAC algorithm is as follows. Hereinbelow, a step of selecting a feature and inspecting whether the selected feature satisfies a predefined constraint may be carried out by the sampler 501, and an operation of calculating, evaluating, determining whether the RANSAC algorithm is terminated, and returning the last homography matrix may be carried out by the model estimator 502.

(1) Selecting features at random
(2) Calculating a homography matrix by the selected features
(3) Evaluating the homography matrix
(4) Repeating a process of terminating the RANSAC algorithm if an evaluated value is over a predetermined value, or go back to (a) if not
(5) Returning the last homography matrix In the RANSAC algorithm, the process stated above may be carried out to eventually obtain a homography matrix. However, since a general random sampling usually results in inconsistency of abstracted features and inaccuracy of a homography matrix which is calculated from the abstracted features, the RANSAC algorithm would be degraded overall in efficiency.

Figure 9:
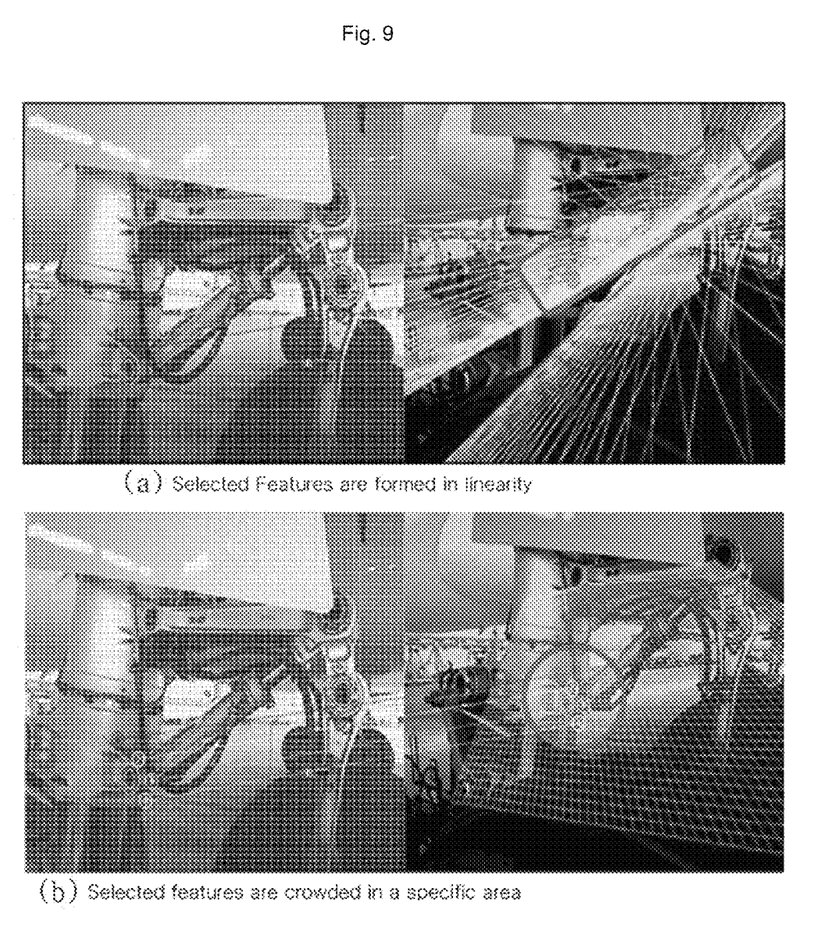
FIG. 9 shows a result of homography estimated when selected features are laid on linearity or crowded in a specific area.

As shown in FIG. 9, if selected features are conformed to the following conditions, it may be impossible to calculate an accurate homography matrix.

(1) Features are formed in linearity
(2) Features are crowded in a specific area Therefore, the present embodiments of the inventive concept are provided to raise the overall efficiency of a RANSAC algorithm for obtaining a homography matrix by applying a CSP to a sampling process of the RANSAC algorithm. For instance, in selecting features, constraints may be applied to prevent insignificant features from being abstracted, unnecessary calculation steps may be reduced to improve the overall efficiency of the RANSAC algorithm, and features abstracted from the state of linearity or a specific area may be excluded to raise accuracy of a homography matrix calculated therein. Accordingly, if features are properly distributed and then selected for calculation of a homography matrix, it may be possible to obtain a more accurate homography matrix.

Preprocessing Process

To apply the CSP to the RANSAC algorithm, in a step before performing the RANSAC algorithm, as shown in FIG. 3, a predisposing process may be first carried out to divide a target image into N×N grids and classify features into coordinates of grid areas.

Features abstracted from each image by means of the SURF may have coordinate values indicating target positions on x and y axes that originate from the left top when a 2D image forms a plane. The image is divided into N×N grid area, and the grid areas are correspondingly classified with reference to the coordinate values of the features which are abstracted from the image. Assuming that a set of all features is X (|X|=m), a unit grid area may include 0~m-numbered features.

By performing the aforementioned process, the features distributed over the image area may be dispersedly classified into the N×N grid areas.

CSP-Based RANSAC

The Constraint Satisfaction Problem (CSP) is an efficient method for searching a solution to satisfying a given constraint, which is capable of finding a solution without considering all cases in a reduced search range because any one that does not satisfy the constraint is excluded from the search range.

The CSP is formed of domains respective to parameters, and constraints, as a problem for finding the constraints in the domains belonging to the parameters.

A CSP to be applied to a sampling process of the RANSAC algorithm is as follows.

(1) Parameters

Figure 10:
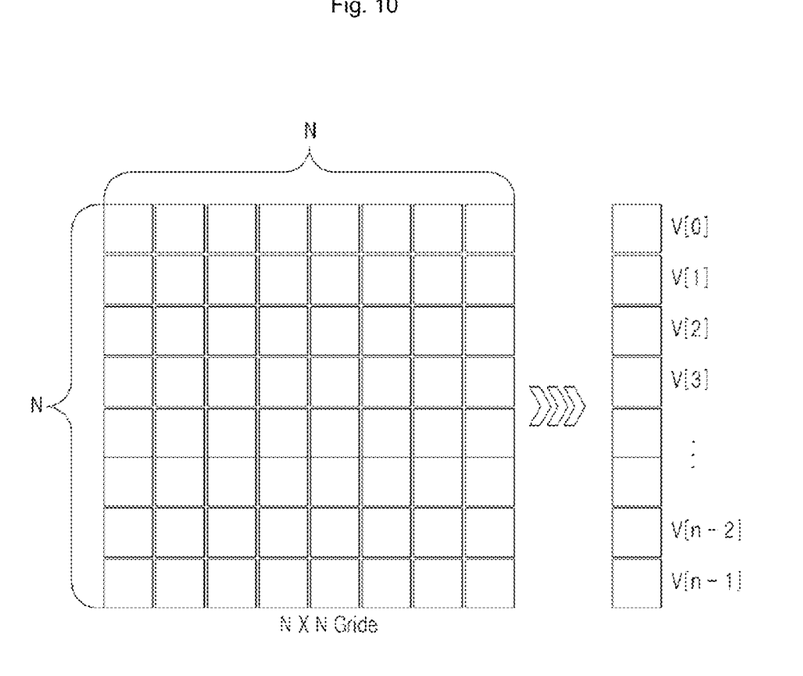
FIG. 10 shows CSP parameters corresponding to grid areas in an embodiment of the inventive concept.

The parameters are substantially arranged by one dimension on a row area in a grid structure (N×N) of V∈{V[i], i=0, 1, 2, . . . , n−1} (see FIG. 10). Hereat, V[i](i=0, 1, 2, . . . , n−1), which is form of integers, indicates index values of grid area where features are selected in their corresponding row areas.

(2) Domains $V[i] \in \{-1, 0, 1, 2, \ldots, n-1\} (i=0,1,2,\ldots,n-1)$,

But, if V[i]=−1, V[i]∈θ.

(3) Constraints
(3-1) Linear constraints
a. The same position
: (selecting one feature in the same grid areas)

Assuming that the whole N×N grids is $G_{r,c}$(r,c=0, 1, 2, . . . , n−1), features belonging to $G_{r,c}$ are $x_k(x_k \in X$(k=0, 1, 2, . . . , m)), and a set of selected features from $G_{r,c}$ is S(S⊂X), |S|=1.

b. Positioning on the same row
: (Selecting one feature on the same row)
Having one value satisfying V[i]∈{−1, 0, 1, 2, . . . , n−1}; (i=0, 1, 2, . . . , n−1).

c. Positioning on the same column
: (Selecting one feature on the same column)

$V[i] \neq V[j]; (i,j=0,1,2,\ldots,n-1; i \neq j)$ d. Positioning on the same diagonal
: (Selecting one feature on the same diagonal)

$V[i] \neq V[j] \pm (i-j); (i,j=0,1,2,\ldots,n-1; i \neq j)$ (3-2) Distance constraints
: (inhibiting, if one feature is selected, another feature from being selected within a distance)
if |i−j|=1 then V[i]≠V[j]±2
if |i−j|=2 then V[i]≠V[j]±1

$(i,j=0,1,2,\ldots,n-1; i \neq j)$

Summarily, after dividing a target image into N×N grids and classifying features into coordinates of their corresponding grid areas, linear and distance constraints respective to the grid areas may be applied thereto to select features. The linear constraints will be described later with reference to Table 1.

Most Artificial Intelligence (AI) may be formalized according to a CSP which is defined with a set of variables $X_1, X_2, \ldots, X_n$ and a set of constraints $C_1, C_2, \ldots, C_m$. Hereat, a parameter $X_i$ may correspond to a nonempty domain $D_i$ among several available values $v_i$. During this, the values may be allocated to a part or the whole parameters ($\{X_i=v_i, X_j=v_j\}$). Unless it goes out of the constraints, the allocation may be consistent and completed as allocating the values to all of the parameters.

The CSP is provided to complete an allocation that satisfies all constraints. The CSP may be representative of patterns of constraints, and used for enabling an effective and general inference even without a specific knowledge about additional domains. According to this, the exemplary embodiments of the inventive concept will be described about a sampling method under the CS-RANSAC algorithm where the CSP is applied to a sampling process that calculates a homography matrix. Especially, according as excluding insignificant samples when obtaining a plane homography matrix between two images, it may be possible to calculate an accurate homography matrix to correctly estimate poses of objects over the whole image area. In other words, as shown in FIG. 4, by excluding features which are formed in linearity or crowded in a specific area, it may be permissible to select features, which are distributed over the whole image area, and then calculate a homography matrix. Therefore, variables prepared to calculate a data model (homography matrix) are defined as a set of features and represented in $f_k$ (k∈{1, 2, . . . , n}). Hereat, n may denote the number of samples.

First, to define values of variables and domains when estimating a model to two target images, an input image $I_s$ may be divided into N×N grid areas. Then, with a target of features which are included in the divided grid area, the CSP may be applied to inspect whether each feature pair satisfies the constraints. The features may represent features which are randomly abstracted among features, which are abstracted from the input image, through a random sampling. During this, values allocable respectively to the features may be determined according to positions (marked with rows and columns) of their corresponding cells where the features are placed. Then the features placed in the same cells may be mapped with the same parameter values.

As such, since the same value is mapped with features which are placed in the same one of plural cells forming a grid area, it may be allowable to exclude samples which are placed each other too closely in a distance. Domains of distinct values $f_k$ indicate positions of their corresponding cells where the distinct values are settled in a grid area.

A model estimation step may be carried out for samples which have been processed through a sampling step. For example, the constraints may be applied to a group of samples which are selected from one of cells forming a grid area. By inspecting whether the constraints are satisfied only in a group of samples, it may be permissible to reduce a search range thereof.

Constraints to Exclude Insignificant Features

In a sampling step, with a target of features for calculating a homography matrix which is selected through a random sampling, the predetermined constraints may be applied thereto. The following Table 1 summarizes the correlations between features which are randomly selected. In embodiments of the inventive concept, the linear and distance constraints may be used to exclude insignificant features, such as problems of linearity and crowd with the features, from a homography matrix.

The linear constraint is predefined to inhibit linear samples from being selected, while the distance constraint is predefined to restrict all samples to be sufficiently distanced each other.

TABLE 1

|   | $f_1$ | $f_2$ | $f_3$ | ... | $f_n$ |
|---|---|---|---|---|---|
| $f_1$ | | $C_{f1,f2}$ | $C_{f1,f3}$ | ... | $C_{f1,fn}$ |
| $f_2$ | | | $C_{f2,f3}$ | ... | $C_{f2,fn}$ |
| $f_3$ | | | | ... | $C_{f3,fn}$ |
| ... | | | | | |
| $f_{n-1}$ | | | | | $C_{fn-1,fn}$ |
| $f_n$ | | | | | |

In Table 1, $C_{fi,fj}$ denotes a set of the constraints between two features $f_i$ and $f_j$.

The following Table 2 shows the predefined linear and distance constraints.

TABLE 2

Definition 1(Linear Constraints) A set if n features satisfies linear constraints iff:
i,j∈{0,...,n} ⇒
<$row_i$ ≠ $row_j$> is true and
<$col_i$ ≠ $col_j$> is true and
<$col_j$ ≠ $col_i$ ± |$row_i$ − $row_j$|> is true
Definition 2(Distance Constraints) A set if n features satisfies linear constraints iff:
i,j∈{0,...,n} ⇒
[|$row_i$ − $row_j$|=1] and [|$col_i$ − $col_j$|>2] is true and
[|$row_i$ − $row_j$|=2] and [|$col_i$ − $col_j$|>1] is true In Table 2, the terms $row_i$ and $row_j$ are indexes indicating rows of their corresponding cells where features $f_i$ and $f_j$ are respectively placed, while the terms $col_i$ and $col_j$ are indexes indicating columns of their corresponding cells where features $f_i$ and $f_j$ are respectively placed.

According to Table 2, if the linear and distance constraints are all satisfied, $C_{fi,fj}$ is determined as true.

In an embodiment, if the linear constraint is applied thereto, only one of features placed on the same row may be selected as a feature for calculating a homography matrix, only one of features placed on the same column may be selected as a feature for calculating a homography matrix, and only one of features placed on the same diagonal may be selected as a feature for calculating a homography matrix. If the distance constraint is applied thereto, by selecting one of features for calculating a homography matrix, it may be permissible to make another feature unselected within a distance from the selected feature. In other words, a feature distanced from a selected feature by a distance may be selected as another one.

In this manner, according as applying the linear and distance constraints, it may be possible to prevent features, which are selected to calculate a homography matrix, from being formed linearity or crowded in a specific area.

The process of performing a sampling with the linear and distance constraints shown in Tables 1 and 2 may be summarized hereinafter.

A sampling algorithm proposed by embodiments of the inventive concept may be based on positional correlations (domains) between features (parameters) abstracted from a target image. Accordingly, N×N grid areas may be used to indicate relative positional correlations between features and the features may be classified on the basis of the grid areas and the coordinates of the features F. Subsequently, the one-dimensional arrangement V[i] may be generated to abstract samples which satisfy the stated constraints. If one or more features are selected at random, row and column values of the grid areas of the selected features may be taken from information classified into the N×N grids and allocated with the V[i] values (allocated in the form of V[row]= column). Then, whether to satisfy the previously allocated V[j] (j=0, 1, 2 . . . , n−1) and the aforementioned constraints may be determined. If satisfied, a method of finally updating V[i] may be used. After performing this process as many as the number of features, a sample satisfying the stated constraints may be abstracted. But, since according to circumstances it would be incapable to find new features which satisfy the constraints with the previously selected features, the process of selecting features may be further performed from the beginning if the operation of selecting features at random becomes over the maximum times as predetermined.

As aforementioned, the CS-RANSAC algorithm may be formed of a sampling step that abstracts features, for calculating a homography matrix, from features which are abstracted from an input image, through a random sampling and then applies the constraints thereto, and a model estimation step that calculates the homography matrix with reference to features which satisfy the constraints. The CS-RANSAC algorithm, as a modification of a sampling step of an RANSAC algorithm, is proposed to exclude insignificant samples, which would be inadvertently selected as features for calculating a homography matrix, before the model estimation step by applying the CSP thereto. The following Table 3 summarizes the CS-RANSAC algorithm.

TABLE 3

Algorithm 1 CS-RANSAC

Input: Extracted features from the input image, the maximum number of sampling iterations $\theta_s$,
the error threshold $\theta_e$.

TABLE 3-continued

Algorithm 1 CS-RANSAC

```
1:  Initialize H = NULL, bestInliers = 0, nIterations = 1,
    nSimSamplaing =0, i=0.
2:  Repeat
3:    Initialize f_n = NULL, f_k = NULL, nInliers = 0, sIterations_i = 0,
      H_i = NULL
4:    While f_n is empty or f_n is not consistent with the constraints in
Definitions 1 and 2 do
5:      If sIterations_i < θ_s do
6:        Sample n features f_n randomly
7:        sIterations_i = sIterations_i + 1
8:        Check the consistency of f_n according to constraints in
Definitions 1 and 2
9:      Else
10:       Sample n features f_n based on similarity rankings
11:       nSimSamplaing = nSimSamplaing +1
12:       Exit While
13:     End If
14:   End While
15:   f_k = f_n
16:   Calculate H_i based on f_k
17:   Calculate nInliers according to θ_ε
18:   If nInliers > bestInliers do
19:     H = H_i
20:     bestInliers = nInliers
21:   End If
22:   Calculate nIterations using Eqn. 1
23:   i = i + 1
24: Until i = nIterations
Output: H
```

As shown by Algorithm 1 of Table 3, it may be allowable to first select n-numbered features at random among features which are abstracted from an input image $I_s$. Then, according to the constraints defined in Table 2, the selected features may be inspected in consistency. In other words, the selected features may be inspected about whether they satisfy the linear and distance constraints. During this, only if the inspected features are agreed with all of the constraints, the next step may be carried out.

Unless one pair of the features satisfies all of the constraints, the CS-RANSAC algorithm may repetitively execute a sampling operation defined as sIterations in Table 3. During this, the sampling operation may be repetitively carried out with reference to the maximum sampling times $\theta_s$ in which the number of sampling iteration times sIterations is predetermined.

In an embodiment, under the condition that one pair of the features selected through a random sampling does not satisfy all of the constraints, if the number of sampling iteration times sIterations is less than $\theta_s$, it may be permissible to reselect other features by reapplying the random sampling to samples which are abstracted from the input image $I_s$.

As another example, under the condition that one pair of the features selected through a random sampling does not satisfy all of the constraints, if the number of sampling iteration times sIterations is larger than $\theta_s$, it may be permissible to reselect other features with reference to similarity instead of the random sampling. For instance, based on Euclidean distances of features which are abstracted from the input image, n-numbered features may be reselected in the order of similarity. During this, the maximum sampling times $\theta_s$ may be set to 100 to prevent an infinite iteration loop.

In this manner, if features are reselected to calculate a homography matrix, the homography matrix may be calculated from the reselected features. An operation of calculating a homography matrix from features in the CS-RANSAC algorithm is substantially the same as the RANSAC algorithm. For example, a data model (a set of features selected to calculate a homography matrix) may be repetitively calculated and updated through a process of reselecting features by applying similarity or CSP model thereto. The data model may be evaluated with reference to the number of inliers. For example, the number of inliers may correspond to a critical error value $\theta_\varepsilon$, and indicate the number of features corresponding to a data model that is generated by iteration.

During this, the number of iteration times of the CS-RANSAC algorithm may be updated at the last of iteration, as given by Equation 3.

$$nIterations = \left\lceil \frac{\log(1 - p)}{\log(1 - (1 - e)^n)} \right\rceil \quad \text{[Equation 3]}$$

In Equation 3, the term p denotes probability that the selected features are all inliers, and for example may be predetermined as 0.999 for obtaining high accuracy. The term e denotes probability that at least one of the selected features is false, which may be calculated by Equation 4. In Equation 3, the term n may denote the number of features that are used for calculating a data model (homography matrix).

$$e = 1 - \frac{\text{Number of Inliers}}{\text{Total Number of features}} \quad \text{[Equation 4]}$$

According to FIGS. 3 and 4, a data model having the largest amount of inliers may be determined as an optimal data model for calculating a homography matrix. For instance, the optimal data model may be a homography matrix H.

Consequently, according to embodiments of the inventive concept, a CSP is applied to a sampling process of the CS-RANSAC algorithm for estimating a homography, thus insignificant samples selected during the sampling process may be excluded to reduce the number of iteration times of the RANSAC algorithm and improve accuracy of an estimated homography.

Additionally, by dynamically applying the constraints and sizes of the grid areas, it may be permissible to process the CS-RANSAC algorithm more efficiently. For example, the CS-RANSAC algorithm may be used to reduce an error rate and a processing time, thereby capable of calculating a homography matrix with high probability of inliers. Now an operation of dynamically applying the constraints will be detailed in conjunction with FIGS. 6 and 7.

Figure 6:
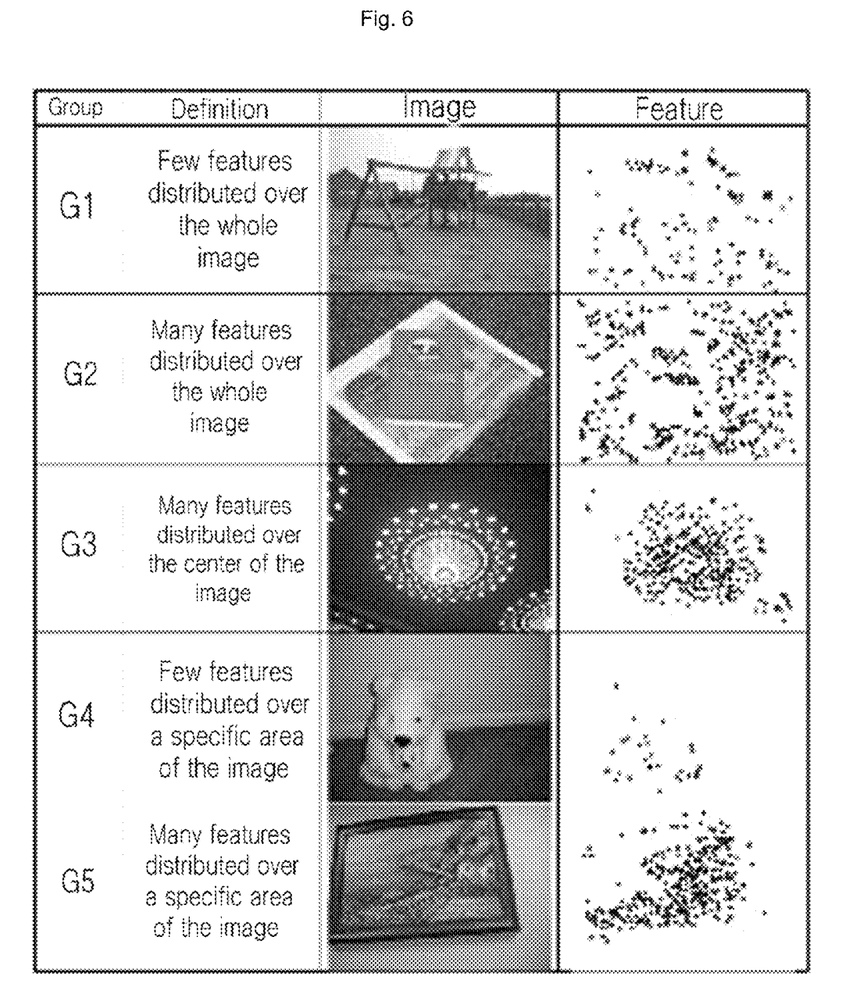
FIG. 6 shows distributions of features in an embodiment of the inventive concept.
Figure 7:
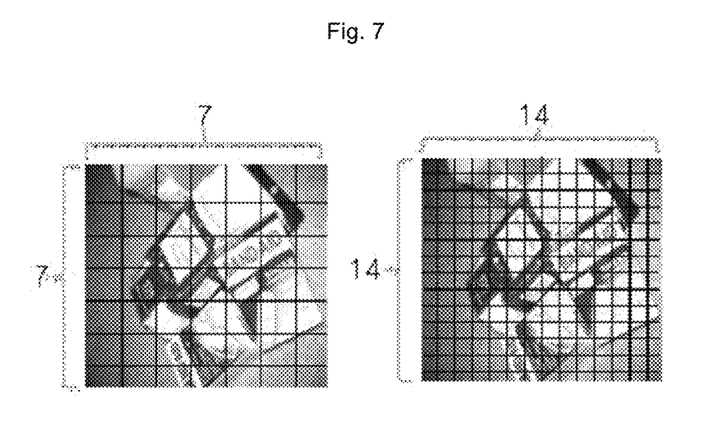
FIG. 7 shows a process of dynamically applying constraints in an embodiment of the inventive concept.

FIG. 6 shows distributions of features in an embodiment of the inventive concept, and FIG. 7 shows a process of dynamically applying constraints in an embodiment of the inventive concept. In FIGS. 6 and 7, operations of abstracting features by means of SURF or SHIFT and dynamically applying the constraints may be carried out in the image processing apparatus 500 of FIG. 5. For instance, the operations may be carried out by the sampler 501 and the model estimator 502.

Referring to FIG. 6, in abstracting features by means of an algorithm such as SURF or SHIFT, the features abstracted according to contents of an input image may be classified into five groups G1 to G5. In FIG. 6, the group G1 corresponds to that few features are distributed over the whole image, the group G2 corresponds to that many features are distributed over the whole image, the group G3 corresponds to that many features are distributed over the center of the image, the group G4 corresponds to that few features are distributed over a specific area of the image, and the group G5 corresponds to that many features are distributed over a specific area of the image.

The CS-RANSAC algorithm according to embodiments of the inventive concept may operate to abstract features from an input image, and effectively select four features exemplarily to calculate a homography from the abstracted features. As the image processing apparatus 500 operates to show various distribution patterns of features according to a type of input image, it may be allowable to dynamically applying the constraints in accordance with a distribution pattern of the features.

In FIG. 7, images 701 and 702 may be exemplarily shown to represent the same image respectively into 7×7 grids 701 and 14×14 grids 702. The image processing apparatus 500 may dynamically determine a size of image in accordance with a distribution of abstracted features, i.e. a pattern of the abstracted features. Subsequently, the image processing apparatus 500 may abstract one feature from each grid at maximum, and then determine whether four features selected from the whole image satisfy the distance and linear constraints.

Figure 8:
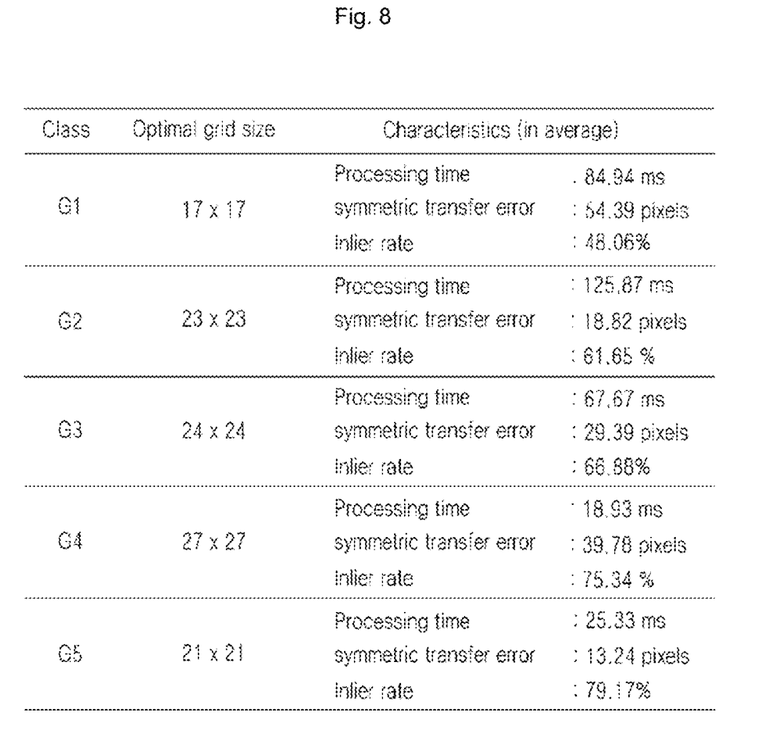
FIG. 8 shows a result of experiment for optimal grid sizes to calculate a homography along patterns of features in an embodiment of the inventive concept.

FIG. 8 shows a result of experiment for optimal grid sizes to calculate a homography along patterns of features in an embodiment of the inventive concept.

Referring to FIG. 8, the image processing apparatus 500 may classify features, which are abstracted from an input image, into five groups. Then, an optimal grid size may be dynamically determined to calculate a homography in accordance with a distribution pattern and the number of features of each group. Referring to FIGS. 6 and 8, the image processing apparatus 500 may classify abstracted features into one of the groups G1 to G5 in accordance with whether few features, among abstracted features, are distributed over the whole image, whether many features are distributed over the whole image, whether few features are distributed over a specific area of the image, or whether many features are distributed over a specific area of the image.

In an embodiment, the image processing apparatus 500 may abstract features from an input image and then analyze which one of the predetermined five groups G1 to G5 has a pattern similar or identical to a distribution of the abstracted features. For instance, the image processing apparatus 500 may use a K-means classification algorithm to determine whether a distribution of the abstracted features is similar or identical to one of the groups G1 to G5 in a predetermined similarity error range. And the image processing apparatus 500 may dynamically apply an optimal grid size, which corresponds to a determined group, to the input image. For example, if a pattern of the abstracted features is determined as corresponding to the group G1, the image processing apparatus 500 may apply an optimal grid size, which corresponds to the preliminarily stored group G1, to the input image. In this manner, the image processing apparatus 500 may assure to improve the performance of homography, for which a homography matrix is calculated by way of applying optimal grid sizes which respectively correspond to the groups.

During this, one feature may be abstracted for each grid, at maximum, and four features may be abstracted from the whole grid. Therefore, the image processing apparatus 500 may determine whether the abstracted four features satisfy the predefined distance and linear constraints. If the four features satisfy the constraints, the image processing apparatus 500 may calculate a homography matrix. Unless the four features satisfy the constraints, the image processing apparatus 500 may repeat a process of abstracting one feature from each grid and abstracting four features at maximum from the whole grid. In this manner, by dynamically applying the grid sizes and constraints to calculate a homography matrix, it may be possible to efficiently process the RANSAC algorithm, as well as calculating the homography matrix in high accuracy.

The aforementioned CS-RANSAC sampling method may be applicable to an AR-based image processing apparatus. Each process included in the CS-RANSAC sampling method may be carried out by the image processing apparatus of FIG. 5.

Although an image processing apparatus for executing the CS-RANSAC sampling method is not illustrated, it may be organized to include a processor and a memory. The memory may be a program corresponding to the CS-RANSAC algorithm that estimates a homography matrix representing conversion correlations between pluralities of images. Especially, with a target as features abstracted from an input image among pluralities of images, the memory may store a program including instructions that select features for calculating a homography matrix by means of a random sampling, applying the constraints to the selected features, and calculating the homography matrix with reference to features satisfying the constraints. The processor may be a unit for processing a sampling process and a model estimation process in accordance with instructions loaded in the memory, which may include a microprocessor such as a CPU.

Methods according to embodiments of the inventive concept may be implemented in a form of program instructions, which are executable by various computer systems, and recorded in a computer readable medium. The computer readable medium may include program instructions, data files, data structures, or combinations of them. Program instructions recorded in the computer readable medium may be specifically designed and composed according to embodiments of the inventive concept, but may be available as being known even by those skilled in the art of computer software. Additionally, the file systems may be recorded in a computer readable medium.

While the inventive concept has been described with reference to exemplary embodiments, it will be apparent to those skilled in the art that various changes and modifications may be made without departing from the spirit and scope of the inventive concept set forth throughout the annexed claim matters. For instance, although the aforementioned techniques are otherwise performed in sequences different from the described methods, and/or the aforementioned system, structures, devices, and circuits are combined or associated, replaced or substituted with other components, it may be possible to achieve an appropriate result thereof.

Therefore, it should be understood that the above embodiments are not limitative, but illustrative, hence all technical things within the annexed claims and the equivalents thereof may be construed as properly belonging to the territory of the inventive concept.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A sampling method for estimating a homography matrix that represents conversion correlations between pluralities of images by means of Constraint Satisfaction-Random Sample Consensus (CS-RANSAC), the method comprising:
   sampling, to divide an input image into a form of grids (N by N), select features, which are used for calculating a homography matrix, from features, which are abstracted from the input image, by means of a random sampling, and inspect whether the features selected by the random sampling satisfy constraints, wherein the sampling is configured to dynamically apply grid sizes in accordance with a distribution pattern of the features abstracted from the input image;
   executing model estimation to calculate the homography matrix from the features only if the selected features satisfy the constraints; and
   determining a position of an object in the input image based on the executed model estimating locations of the selected features in the input image relative to the abstracted features in the input image.

2. The sampling method according to claim 1, wherein the sampling is configured to dynamically apply grid sizes and constraints in accordance with a distribution pattern of the features abstracted from the input image.

3. The sampling method according to claim 1, wherein the sampling is configured to calculate the homography matrix only if the constraints are satisfied by reapplying the random sampling to the features abstracted from the input image unless the features selected through the random sampling satisfy the constraints.

4. The sampling method according to claim 1, wherein the sampling is configured to reselect features, which are used for calculating the homography matrix, with reference to the predetermined number of iteration times and the maximum number of sampling times unless the features selected through the random sampling satisfy the constraints.

5. The sampling method according to claim 4, wherein a size of a grid area, in which the features are dispersedly classified, is dynamically determined by a distribution pattern of the features abstracted from the input image.

6. The sampling method according to claim 1, wherein the sampling is configured to dispersedly classify features, which are distributed over the whole area of the input image, and select the features, which are used for calculating the homography matrix, by applying Constraint Satisfaction Problems (CSP).

7. The sampling method according to claim 6, wherein the CSP is configured to include variables that represent the features, domains that represent positional correlations of the features, and the constraints.

8. The sampling method according to claim 1, wherein the sampling is configured to execute a predisposing process that divides the input image of the plural images into pluralities of grid areas, and classifies the features, which are abstracted from the input image, into the grid areas.

9. The sampling method according to claim 8, wherein the sampling is configured to classify the features, which correspond to each unit grid, with reference to coordinate values of the features.

10. The sampling method according to claim 1, wherein the sampling is configured to apply at least one of linear and distance constraints, the linear constraint being configured to prevent other features from being selected at a position forming linearity with the selected features, and the distance constraint being configured to prevent other features from being selected in a distance from the selected features.

11. A computer readable hardware storage device including instructions to control a computer system to execute a Constraint Satisfaction-Random Sample Consensus (CS-RANSAC) algorithm,
wherein the CS-RANSAC algorithm is a method of a homography matrix that represents conversion correlations between pluralities of images,
wherein the instructions is configured to control the computer system through a method comprising:
sampling, to select features, which are used for calculating a homography matrix, from features, which are abstracted from an input image of the plural images, by means of a random sampling, and inspect whether the features selected by the random sampling satisfy constraints, wherein the sampling is configured to apply at least one of linear and distance constraints, the linear constraint being configured to prevent other features from being selected at a position forming linearity with the selected features, and the distance constraint being configured to prevent other features from being selected in a distance from the selected features;
executing model estimation to calculate the homography matrix from the features that satisfy the constraints; and
determining a position of an object in the input image based on the executed model estimating locations of the selected features in the input image relative to the abstracted features in the input image.

12. The computer readable hardware storage device according to claim 11, wherein the sampling is configured to execute a predisposing process that divides the input image of the plural images into pluralities of grid areas, and classifies the features, which are abstracted from the input image, into the grid areas.

13. An image processing apparatus for estimating a homography matrix that represents conversion correlations between pluralities of images by means of Constraint Satisfaction-Random Sample Consensus (CS-RANSAC), comprising:
a processor, a memory, and a display; and
a set of instructions stored in the memory that cause the processor to perform the following:
to select features, which are used for calculating a homography matrix, from features, which are abstracted from the input image, by means of a random sampling, and inspect whether the features selected by the random sampling satisfy constraints;
calculate the homography matrix from the features that satisfy the constraints; and
determine a position of an object in the input image based on the executed model estimating locations of the selected features in the input image relative to the abstracted features in the input image,
wherein the image processing apparatus, as the features selected through the random sampling disagree with the constraints, is configured to reselect features, which are used for calculating the homography matrix, from features, which are abstracted from the input image, with reference to similarity of the abstracted features.

14. The image processing apparatus according to claim 13, the set of instructions further causing the processor to: dynamically apply one of pluralities of predefined grid sizes in accordance with a distribution pattern of the feature abstracted from the input image.

15. The image processing apparatus according to claim 13, the set of instructions, as the features selected through the random sampling disagree with the constraints, further causing the processor to: reapply the random sampling to the features abstracted from the input image, and reselect features for calculating the homography matrix.

16. The image processing apparatus according to claim 13, the set of instructions further causing the processor to: execute a predisposing process that divides the input image of the plural images into pluralities of grid areas, and classifies the features, which are abstracted from the input image, into the grid areas.

17. The image processing apparatus according to claim 13, the set of instructions further causing the processor to: apply at least one of linear and distance constraints, the linear constraint being configured to prevent other features from being selected at a position forming linearity with the selected features, the distance constraint being configured to prevent other features from being selected in a distance from the selected features.

* * * * *